US008297115B2

(12) United States Patent
Borgers et al.

(10) Patent No.: US 8,297,115 B2
(45) Date of Patent: Oct. 30, 2012

(54) PIEZORESISTIVE PRESSURE-MEASURING PLUG FOR A COMBUSTION ENGINE

(75) Inventors: Marc Gerard Johan Borgers, Enschede (NL); Cris Ruiz Zwollo, Enschede (NL); Robert Zwijze, Vriezenveen (NL); Paulus Thomas Johannes Gennissen, Markelo (NL); Tim Tiek, Enschede (NL); Huub Toneman, Enschede (NL); Serge Groenhuijzen, Borne (NL)

(73) Assignee: Sensata Technologies, Inc., Attleboro, MA (US)

( * ) Notice: Subject to any disclaimer, the term of this patent is extended or adjusted under 35 U.S.C. 154(b) by 537 days.

(21) Appl. No.: 12/490,118

(22) Filed: Jun. 23, 2009

(65) Prior Publication Data
US 2009/0320576 A1 Dec. 31, 2009

(30) Foreign Application Priority Data

Jun. 25, 2008 (EP) .................................... 08158944

(51) Int. Cl.
*G01M 15/08* (2006.01)
(52) U.S. Cl. .................................................. 73/114.19
(58) Field of Classification Search ............... 73/114.16, 73/114.18, 114.19
See application file for complete search history.

(56) References Cited

U.S. PATENT DOCUMENTS

| 6,538,366 | B1 * | 3/2003 | Drecq ........................... 313/141 |
| 7,159,448 | B2 * | 1/2007 | Moelkner et al. ............ 73/35.12 |
| 7,228,730 | B2 | 6/2007 | Haussner et al. |
| 7,635,826 | B2 * | 12/2009 | Yamada et al. ............... 219/270 |
| 2005/0034525 | A1 * | 2/2005 | Moelkner et al. ............... 73/715 |
| 2005/0061063 | A1 | 3/2005 | Haussner et al. |
| 2005/0150301 | A1 * | 7/2005 | Skinner et al. ................. 73/714 |
| 2007/0295710 | A1 * | 12/2007 | Yamada et al. ............... 219/270 |

* cited by examiner

*Primary Examiner* — Eric S McCall
(74) *Attorney, Agent, or Firm* — Chapin IP Law, LLC (57) ABSTRACT

A piezoresistive pressure-measuring plug for a combustion engine for measuring a pressure. The piezoresistive pressure-measuring plug:
includes a plug body for insertion into a cylinder of the combustion engine, a rod that is arranged in the plug body, a sensing structure comprising a piezoresistive element, that is arranged between the rod and the plug body such that the sensing structure is acted upon, when in use, by the pressure prevailing in the combustion chamber of the cylinder. The sensing structure is arranged in the plug body and, when in use, is compressed in an axial direction by the force applied to the sensing structure and a piezoresistive element mounted on the sensing structure. A PWB is also arranged in the plug body. Such a pressure-measuring plug provides improved bandwidth and reduced build-in height.

16 Claims, 8 Drawing Sheets

PIEZORESISTIVE PRESSURE-MEASURING PLUG FOR A COMBUSTION ENGINE

FIELD OF THE INVENTION

The invention relates to a pressure-measuring plug for a combustion engine with a plug body for insertion into a cylinder of the combustion engine, a rod which is arranged in the plug body, and a sensing structure, which is arranged between the rod and the plug body in such a way that the sensing structure is acted upon by the pressure prevailing in the combustion chamber of the cylinder, whereby the rod transmits the pressure in the combustion chamber of the cylinder to the sensing structure and in which the rod is arranged in the plug body so as to be displaceable in a sliding manner in the axial direction relative to the plug body, so that the pressure in the combustion chamber leads to an axial motion of the heating rod relative to the plug body, as a result of which motion the sensing structure is acted upon by a force.

BACKGROUND OF THE INVENTION

A pressure-measuring plug of the above-mentioned type is known from U.S. Pat. No. 7,228,730 and US 2005/0061063.

In these known pressure-measuring plugs, the heating rod is displaceable in a sliding manner in the axial direction over the full length of the plug body. With a pressure-measuring glow plug of the above mentioned type, the combustion pressure is transmitted directly via the heating rod to a pressure sensor.

The known pressure-measuring plugs have a resonance frequency at about 8-9 kHz depending on the length of the glow rod. This limits the bandwidth of output of the pressure sensor to 3-4 kHz.

Advanced combustion strategies for gasoline and diesel engines in the future depend on the existence of accurate pressure feedback from each combustion cylinder during the entire engine cycle (compression-combustion-exhaust cycle). These strategies may or may not include Homogeneous Charge Compression Ignition HCCI combustion, and can result in high pressure release rates which require a fast and accurate pressure response. Fast pressure sensors are in this context sensors with a high bandwidth response and a low response time. There is a need to measure the pressure in a combustion cylinder continuously and real time.

In gasoline engines, the 'knocking' of the engine, i.e. self-ignition, can be seen in the course of the pressure in the combustion chamber at a frequency around 7 kHz. In the frequency spectrum also harmonic frequencies, e.g. 14 kHz, of the 'knocking' frequency can be found. In view of this, a pressure-measuring plug with a higher bandwidth then the know plugs is needed.

Furthermore, in the known pressure-measuring plugs, the pressure-sensor and corresponding electronics to measure and condition the signal obtained from the piezoresistive elements are located in a housing mounted on top of an open end of the plug body. After insertion of the pressure-measuring plug in the engine, the housing is outside the engine. Therefore, the temperature of the electronics will correspond to the temperature outside the engine. In some applications, the pressure-measuring plug is located near a turbocharger or other heat source of the combustion engine. The turbocharger will increase the environmental temperature up to around 200° C. The regular temperature change from outside temperature, which is normally in the range of 0-30° C., to a temperature of 200° C. while driving, will stress the electronics and increase the failure rate.

Furthermore, the maximum pressure to be measured will increase. As a result, the mounting force on the housing will increase. The mounting forces on the housing will in the known pressure measuring plugs provided with rod, result in an offset in the sensor signal, requiring that the sensor electronics have to compensate for this after mounting the plug in an engine. EP0793082A1 discloses a pressure measuring plug with a cylindrical measuring body inserted into a the housing and fixed at an opening of the housing by welding.

SUMMARY OF THE INVENTION

It is an object of the present invention to provide an improved pressure-measuring plug.

According to the present invention, the sensor arrangement comprises a plug body for insertion into a cylinder of the combustion engine, a rod that is arranged in the plug body, and a sensing structure that is arranged between the rod and the plug body, and in such a way that the sensing structure is acted upon, in use, by the pressure prevailing in the combustion chamber of the cylinder, whereby the rod transmits the pressure in the combustion chamber of the cylinder to the sensing structure due to the pressure in the combustion chamber leading to an axial motion of the rod relative to the plug body so as to apply a force to the sensing structure, wherein the sensing structure is integrated and located in the plug body and a piezoresistive element mounted on the sensing structure provides a resistance change when the rod is moved in axial direction.

The pressure-measuring plug according to the invention takes away the disadvantage of the known piezoresistive cylinder pressure sensors where the sensing structure is positioned outside the plug body, which length is defined by the thickness of the engine body. The length of the plug body defines the length of the glow rod or force transfer rod. This length limits the pressure sensor bandwidth.

The new miniaturized sensing structure allow us to move the sensing structure toward the combustion cylinder and consequently to reduce the length of the rod. By using a shorter rod, the mass of the rod decreases, which decreases the inertia of the rod with respect to the pressure in the combustion chamber to be transmitted to the sensing structure.

A further advantage is that the axial movement of the tip of the rod with respect to the sensing structure will decrease. The pressure acting on the rod will axially compress the rod. This results in a change in length of the rod. Therefore, the axial movement of the tip of the rod will be larger than the axial movement where the rod is coupled to the sensing structure. Furthermore, the length of the rod will vary due to temperature changes. A pressure-measuring plug comprises an absolute tight sealing element between the rod and plug body with respect to the prevailing combustion pressure, and guarantee that the heating rod can move friction-free in the axial direction in the plug body. The sealing element should be suitable to follow all axial movements, i.e. thermal extension, axial compression by pressure. By moving the sensing structure to the tip of the rod, the length of the rod between the sealing element and the sensing structure is reduced and consequently the overall axial movement the seal has to bridge is reduced. This allows the use of a simpler, lower cost sealing element.

In an embodiment of the invention, in use the sensing structure is compressed in axial direction by the force applied to the sensing structure and a piezoresistive element mounted on the sensing structure provides a resistance change corresponding to the surface strain in axial direction due to the compression.

In another embodiment of the invention, the sensing structure is a membrane structure, which transforms an axial movement of the rod in a surface strain in radial direction and the piezoresistive element mounted on the sensing structure provides a resistance change representing the surface strain in radial direction when the rod is moved in axial direction. In a further embodiment, a body middle part comprises an annular flange for positioning an annular PWB (Printed Wiring Board) in the plug body. The annular flange enables us to position an annular PWB in the neighborhood of the piezoresistive elements and to bond the piezoresistive elements with the PWB with minimal mechanical coupling.

In yet another embodiment of the invention, the sensor arrangement comprises a plug body for insertion into a cylinder of the combustion engine, characterized in that, the plug body comprises a body lower part and a body middle part wherein the body lower part comprises a sealing surface part for providing a seal between the body lower part and the combustion engine when inserted in the engine. The body lower part further comprises an elongated hollow body part at an end linked to the sealing surface part wherein the elongated hollow body part friction free extends in the body middle part. The sensing structure is attached to an end of the lower body part opposite to the end linked to the sealing surface part.

The pressure-measuring plug according to the invention is significantly less sensitive to the influence of mounting forces. In the known cylinder pressure sensors provided with heating rod, a front sealing provides an initial tension on the sensing structure which is positioned outside the plug body. When mounting the plug in an engine, the plug body is compressed along the longitudinal axis and/or deformed, which causes a mounting force to exert on the sensing element. By means of the elongated hollow body, the sensing structure is mechanically placed at distance from the plug body parts that could be deformed when mounting the plug in an engine. As a result any deformation of the plug body has less influence on the sensing structure.

In an embodiment of the invention, the piezoresistive pressure measuring plug further comprising a front membrane providing a sealing between the lower body part and the pressure force interface part. In this way, the contact area of the fluid with the plug is reduced to the sealing part of the plug body, the front membrane and the rod. Furthermore, the high pressure is only directly acting on the front membrane and rod, which results in less high requirements with respect to the pressure acting on the elongated hollow body.

In an embodiment of the invention, the pressure force interface part is an elongated interface body comprising a through hole for receiving a rod. In a further embodiment, an end of the through hole the elongated interface body is connected to the sensing structure and at an opposite end of the though hole the elongated interface body is connected to the front membrane. These features enables to manufacture a calibrated pressure plug sub-assembly, which can be finalized by another manufacturer, by inserting a heating rod or temperature rod in the through hole and welding the rod to a free end of the pressure force interface part. No calibration of the pressure sensor is needed after finalizing the sensor glow plug as both the addition of the rod and the mounting into an engine do not deform the calibrated sensing structure resulting in an offset in the sensor signal.

In an embodiment of the invention, the sensing structure (104) is integrated and located in the plug body. The new miniaturized sensing structure allows to move the sensing structure toward the combustion cylinder and consequently to reduce the length of the rod. By using a shorter rod, the mass of the rod decreases, which decreases the inertia of the rod with respect to the pressure in the combustion chamber to be transmitted to the sensing structure and therefore increasing the sensor bandwidth.

BRIEF DESCRIPTION OF THE DRAWINGS

The present invention will be discussed in more detail below, using exemplary embodiments, with reference to the attached drawings, in which.

DETAILED DESCRIPTION OF EXEMPLARY EMBODIMENTS

Figure 1:
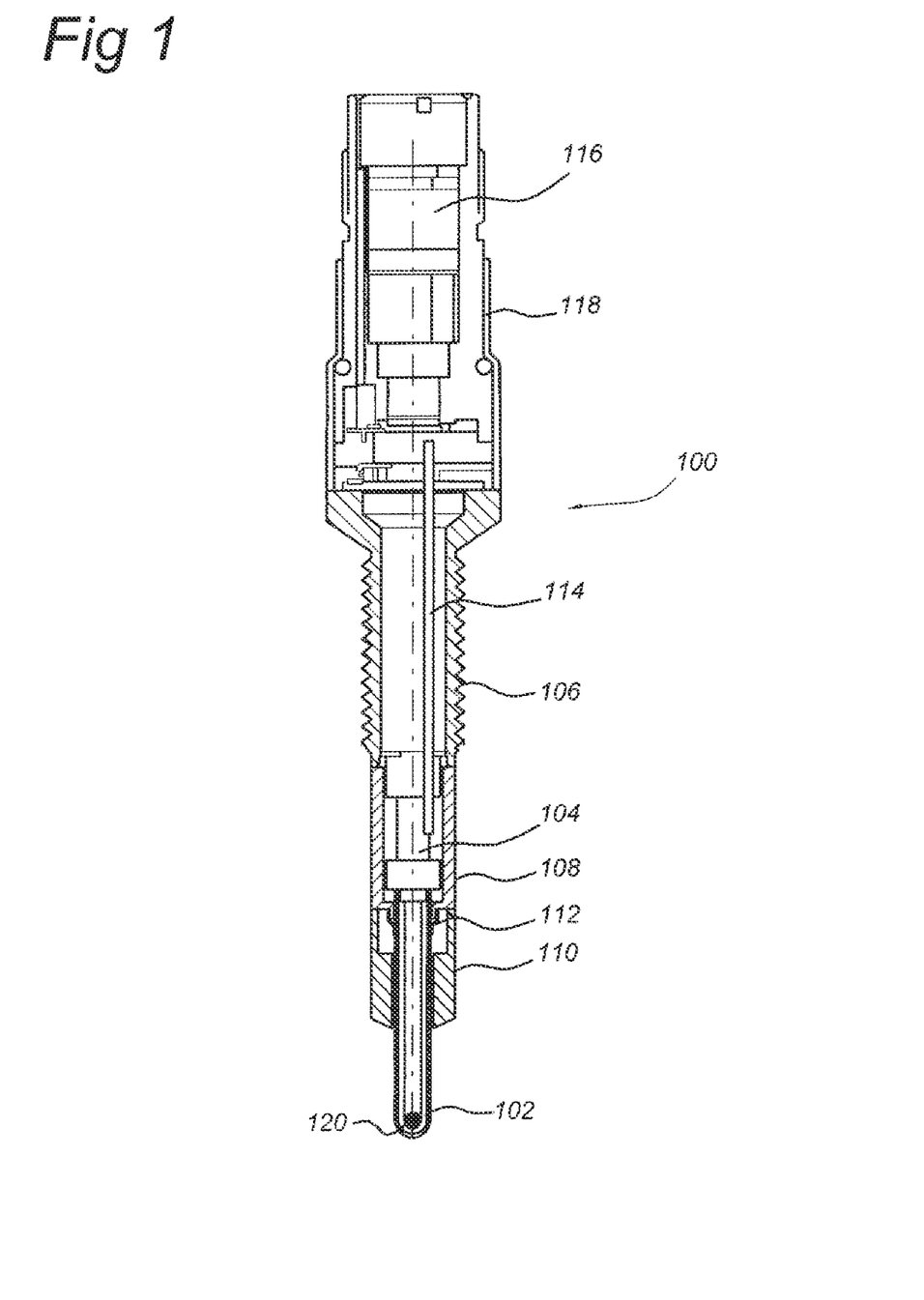
FIG. 1 shows a sectional view of a first embodiment of a sensor arrangement according to the present invention.

A first embodiment of a pressure-measuring plug 100 according to the invention is shown in FIG. 1. The pressure-measuring plug 100 comprises a rod 102, a plug body 110, 108, 106, a sensing structure 104, a PWB 114 provided with sensor electronics and sensor electrical connections 116. The sensor electrical connections 116 are arranged in a housing 118, which is arranged to seal from the environment the cavity in the plug body 106, 108, 110 wherein the sensing structure 104 and the sensor electronics 114 are located.

In the example of the embodiment shown in FIG. 1, plug body 110, 108, 106 comprises a body lower part 110, a body middle part 108 and a body upper part 106, which are connected together mechanically. The body lower part 110 is provided on the combustion chamber side with a sealing cone, by means of which the pressure measuring plug seals off the combustion pressure at the cylinder head. The body middle part 108 encompasses the sensing structure 104. The sensor electrical connections side of the sensing structure 104 is rigidly connected mechanically to the body middle part 108. The body upper part 106, which is a threaded body part arranged to fix the pressure measuring plug 100 into the combustion engine, is arranged to encompass the sensor electronics on PWB 114, which are arranged to measure a resistance change of the piezoresistive elements mounted on the sensing structure 104 and to generated a conditioned measurement signal there from. The sensor electronics could be mounted on the PWB 114 which is positioned parallel to the body axis of the plug body 106, 108, 11(0. The sensor electronics could comprise a ASIC arranged to perform at least one of the following actions: temperature compensation of a signal obtained from the pressure sensor, i.e. piezoresistive element, calibration of the signal obtained from the pressure sensor, internal fault detection, converting the signal from the pressure sensor to a conditioned measurement signal.

The rod 102 is arranged in the pressure-measuring plug so as to be displaceable in a sliding manner in the axial direction relative to the plug body, 110, 108, 106, in such a way that a variation of the pressure in the combustion chamber leads to an axial motion of the rod 102 relative to the plug body 110, 108, 106. As a result of this axial motion, a force acts on the sensing structure 104. The rod 102 can be a heating rod, force transfer rod (dummy rod) or temperature measuring rod. In the last case, the rod comprises a temperature sensitive electrical element 120 which could be any suitable Resistance Temperature Detectors (RTD), thermo couple or thermistor such as an NTC resistor.

The rod 102 is rigidly connected mechanically to the sensing structure 104 and a sealing element 112 between the rod 102 and the plug body 110, 108, 106. The sealing element 112 guarantees that the rod 102 can move friction-free in the axial direction in the plug body 110, 108, 106.

Figure 6:
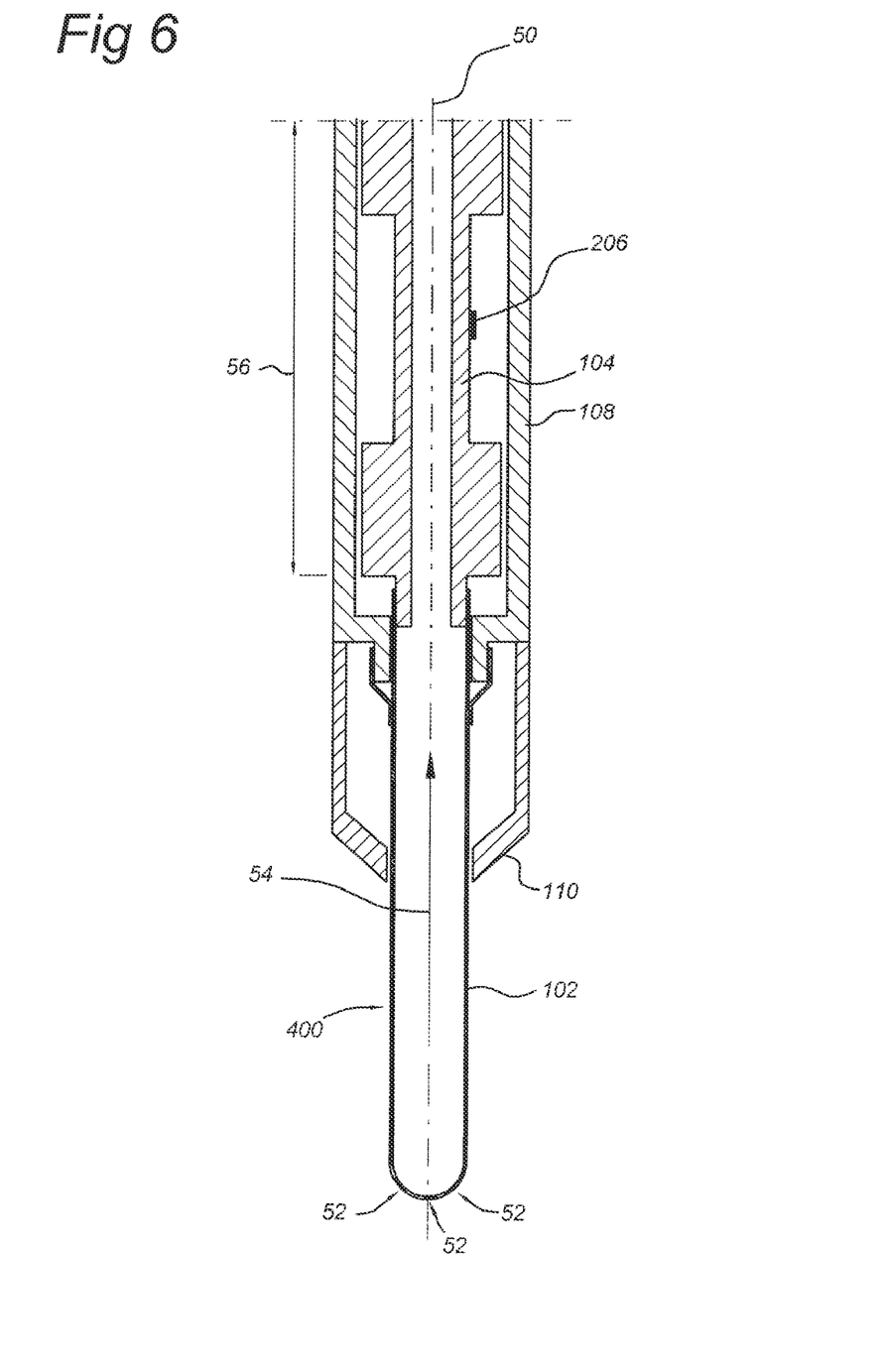
FIG. 6 elucidates the principle of forces acting on the pressure-measuring plug.

The pressure-measuring glow plug shown in the drawing works in the following manner which is shown in FIG. 6:

As a result of the combustion pressure or the compression pressure 52 of the piston, the rod 102, which can be a heating rod, force transfer rod or temperature measuring rod, is displaced in the axial direction 54 towards the sensing structure 104, which sits at the end of rod 102 on the connection side in the plug body 110, 108, 106 and to which is mounted a piezoresistive sensor, a wire strain gauge or a similar measuring element 206. Due to this displacement, the rod 102 presses with a certain force onto sensing structure 104, as result of which the sensing structure is compressed in axial direction 50 relatively to the plug body 110, 108, 106 and a change in the force or tension present at the measuring element is brought about, which is processed by suitable evaluation electronics into a measurement signal. The compression will result in a change of the length of the sensing structure 104 indicated by 56.

By having a sensing structure in the plug body, the total mass and length of the body that is moving in the axial direction is reduced significantly relative to a sensing structure which is arranged at an end of the plug body and wherein the rod extends along the whole plug body. A reduction of the mass and length leads to a structure for pressure measuring with a higher bandwidth then the prior art structures.

Furthermore, the cavity in the plug body between sensing structure 104 and sensor electrical connections 116 can be used to position a PWB 114 carrying the sensor electronics. This enables reduction of the size of housing 118, which leads to a smaller product enabling the installation where space is restricted.

Furthermore, by positioning the sensor electronics on PWB 114 in the threaded body part 106, the temperature in the cavity will mainly be determined by the temperature of the engine. The threaded portion of the product is cooled by the engine cooling system and therefore the sensor electronics located in the cavity of said threaded portion will not see extreme temperatures. At the connector side high temperatures, i.e. over 150° C., can be expected when the plug is mounted close to a turbo generator, exhaust manifold, etc. The lower maximum temperature and reduced range of temperature change will improve the product life cycle of the pressure-measuring plug.

Figure 2:
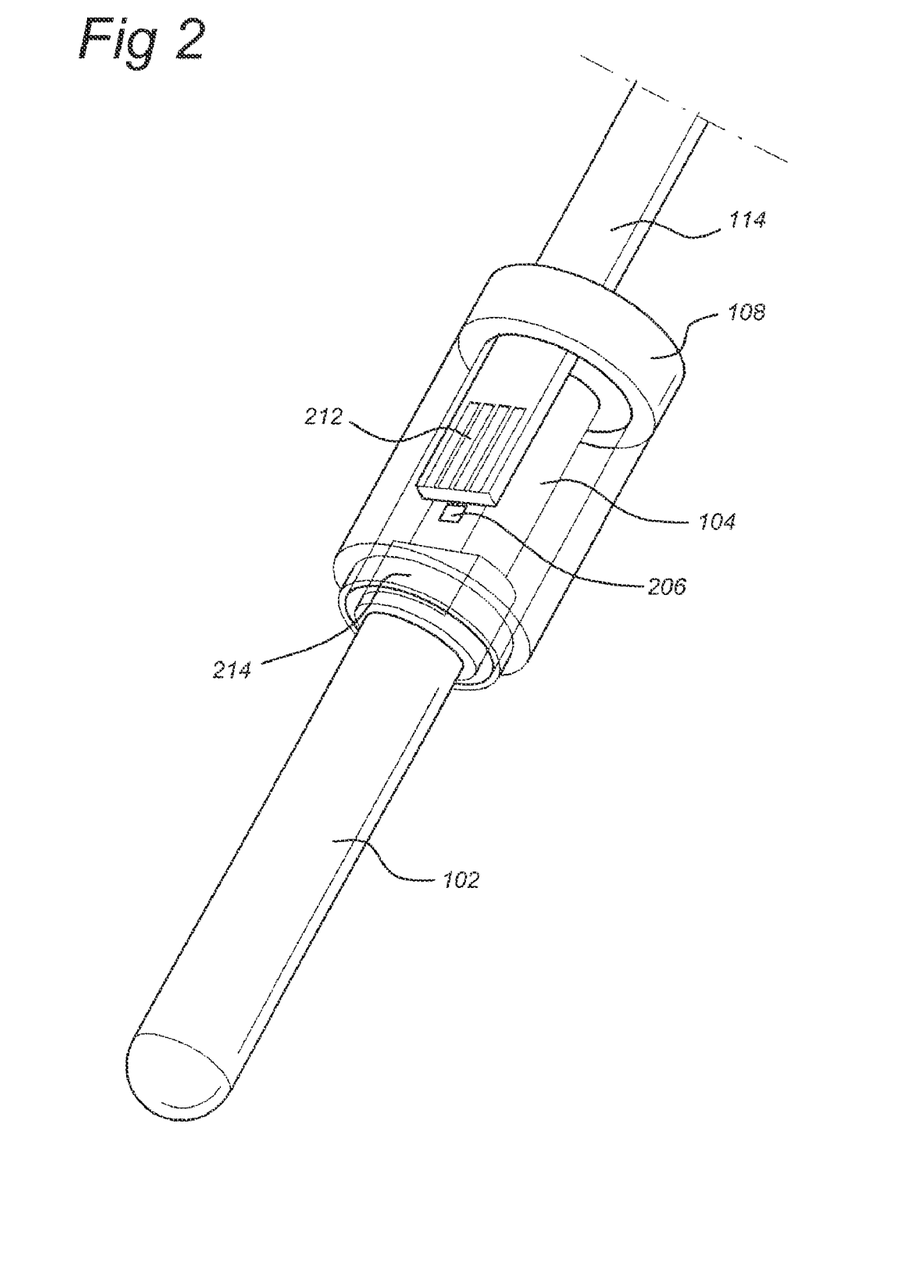
FIG. 2 shows a perspective view of the rod, sensing structure and PWB.

FIG. 2 shows a perspective view of the rod 102, sensing structure 104 and Printed Wiring Board (PWB) 114. The PWB 114 carries the sensor electronics. The PWB is mounted on a flat surface area of the sensing structure 104. Furthermore, on the flat surface area, strain gauges 206 with piezoresistive properties are mounted. Contact area 212 on the PWB 114 is used to connect the strain gauges 206 with the sensor electronics on PWB 114. Furthermore, the contact area 212 could be used to connect the heating element of a heating rod or a temperature sensing element provided in the rod. Furthermore, the body middle part 108 is shown in FIG. 2. The sensing structure 104 is rigidly connected to the body middle part 108 at the connector side and is friction-free positioned in the body middle part 108 at the combustion chamber side. The body middle part 108 comprises an outside shaft 214 on which a sealing element, not shown in FIG. 2, can be connected mechanically, to seal the cavity in the plug body comprising the sensing structure 104 and PWB 114 from the combustion chamber pressure.

Figure 3:
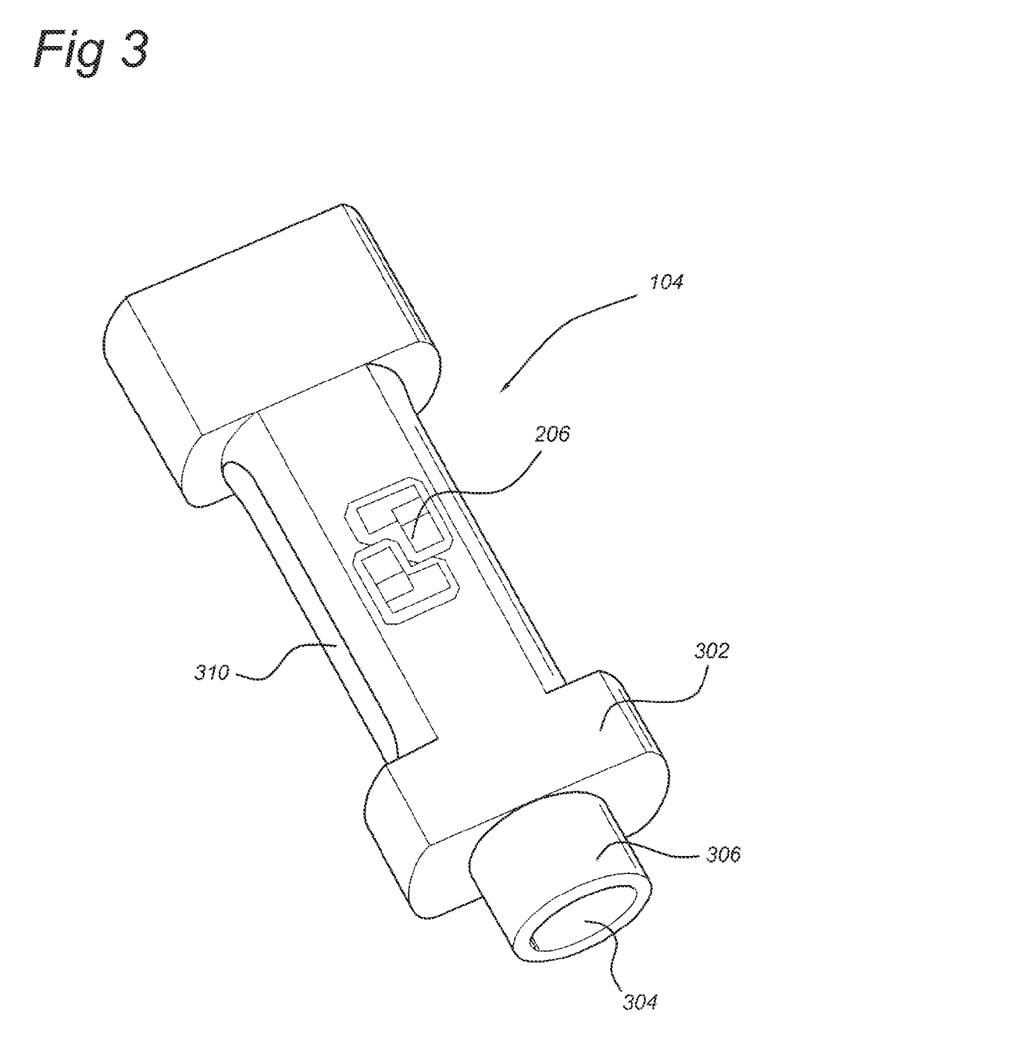
FIG. 3 shows a perspective view of a first embodiment of the sensing structure.

FIG. 3 shows a perspective view of an embodiment of the sensing structure 104 on which a strain gauge structure 206 with piezoresistive properties is mounted. The sensing structure 104 is a tube with optionally parts cutout or locally thinned walls. The strain gauge structure 206 is mounted on a flat outer surface 302 of the sensing structure 104. In an embodiment the sensing structure 104 comprises two flat surfaces at opposite sides of the sensing structure 104 to provide a symmetrical structure. The flat surfaces 302 are placed out of the axial centre of the sensing structure 104.

Furthermore, the sensing structure 104 is made thinner at the location where the strain gauges 206 are located. This results in more axial compression at said location and consequently in more strains in the surface area below the strain gauge structure 206. A hole 310 in the wall of the sensing structure 104 near the position of the strain gauge structure 206 could be provided to enlarge the axial compression when applying the same axial pressure on the sensing structure 104.

The sensing structure 104 shown in FIG. 3 comprises an outside shaft 306 designed to receive a cylindrical end part of the rod 102. Furthermore, the sensing structure 104 comprises an axial cavity 304 to allow a centre current pin or conductor 406 of a heating rod to protrude through the sensing structure 104 or at least the outside shaft 306. In an embodiment, the axial cavity 304 forms a channel through the sensing structure 104 enabling a wire 424 to connect the centre current pin 406 with circuitry on the PWB carrying the sensor electronics. In this case, the wiring on the PWB should be suitable to conduct the current needed to heat the heating rod. In case the rod comprises a temperature sensor, the cavity 304 is used for passing the electrical connections between the temperature sensor and temperature sensor electronics on the PWB or sensor electrical connections 116.

A strain gauge structure 206 is mounted on the flat outer surface 302 using glass bonding. The strain gauge structure 206 is made of piezoresistive material and comprises two or four strain gauges to be used in a half or full Wheatstone bridge respectively.

Figures 4, 5:
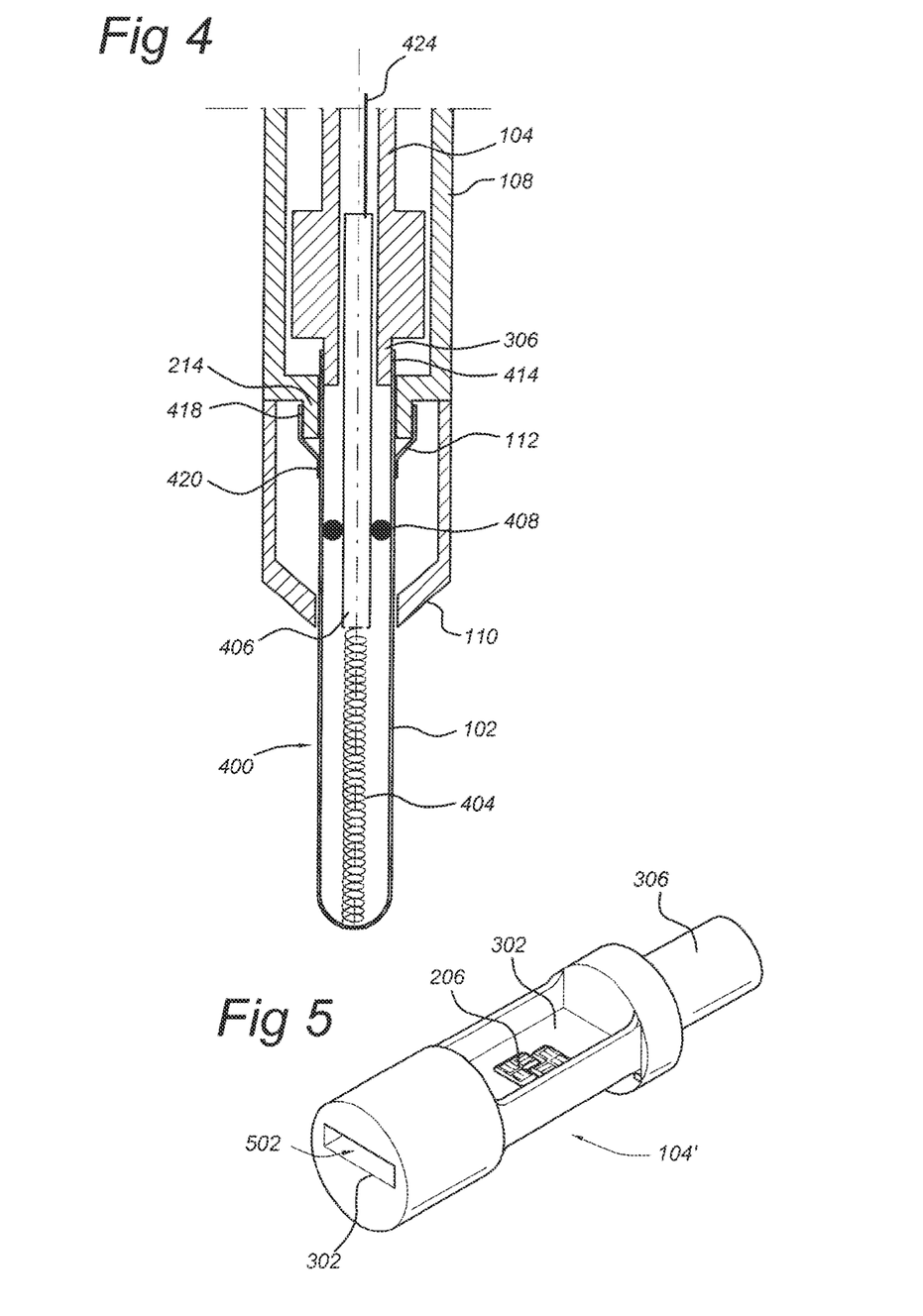
FIG. 4 shows an enlarged sectional view of a top region of the first embodiment of the pressure-measuring plug.
FIG. 5 shows a perspective view of a second embodiment of the sensing structure.

FIG. 5 shows a perspective view of another embodiment of the sensing structure 104', the flat section 302 is positioned on the neutral bending line which is near the centric body axis of the plug body 106, 108, 110. The strain gauges are bonded on a position on the flat section coinciding the neutral bending line. By having the strain gauges on the neutral bending line, wagging of the rod in the plug body resulting in a bend of the sensing structure 104', will result in a minimal change in the resistance value of the strain gauges structure 206. In this embodiment, there is no axial channel along the central body axis of the sensing structure. Similarly to the sensing structure in FIG. 3, the sensing structure 104' comprises an outside shaft 306 on which a cylindrical end part of a rod 102 can be pushed and welded to form a rigid connection. The outside shaft 306 could comprise a part of the channel to allow an electrical connection by means of wires between the heating element of a heating rod or temperature sensor in the rod and PWB 114 carrying the sensor electronics. Furthermore, the sensing structure 104' comprises an opening 502 for positioning the PWB and mounting the PWB on the flat section 302.

FIG. 4 shows schematically an enlarged sectional view of the top region of the first embodiment of the pressure-measuring plug. The rod is the external body of a heating rod 400 which comprises an external body 102, a heating element 404, a conductor 406, which is arranged to supply the current to heat the heating element 404 and a support member 408, which is arranged to prevent electrical connection between the conductor 406 and the external body 102. In FIG. 4, the sensing structure 104 comprises a channel in axial direction to pass through the conductor 406.

The external body 102 of the heating rod 400 is rigidly connected to the sensing structure 104 and a sealing element 112 between the external body 102 and the plug body 110, 108. The sealing element 112 guarantees that the heating rod 400) can move friction-free in the axial direction in the plug body 110, 108 and protects the sensing element from the extreme temperatures resulting from the combustion process. The pressure acting on the sealing element 112 is partially converted into a force acting in axial direction on the pressure sensing structure 104.

The sealing element 112, which is preferably made from a metallic material, is connected mechanically to the external body 102, for example, by means of the fact that a radial circumferential fillet weld is provided at an end face from the cylindrical part 420 of the sealing element 112 to external body 102 or a radial circumferential through-weld is provided in a cylindrical part 420 of the sealing element 112. The connection can be achieved in this region to the heating rod also by means of laser welding, crimping, swaging, soldering, press-fit etc. The sealing element 112 can be in the form of a membrane as shown in FIG. 4 or a bellows-like seal (not shown).

FIG. 4 shows the body lower part 110 and the body middle part 108, which are connected together mechanically. The body lower part 110 is provided on the combustion chamber side with a sealing cone, by means of which the pressure-measuring plug seals off the combustion pressure at the cylinder head.

At the other side 418 of the sealing element 112, the sealing element 112 is connected mechanically to body middle part 108. At this point, the sealing element 112 can be designed with a cylindrical part, which is pushed onto an outside shaft 214 of body middle part 108 and is connected mechanically thereto. Furthermore, the connection possibilities are the same as with the connection of the sealing member 112 to the heating rod 400.

Similarly, the external body 102, which can be designed with a cylindrical end part 414, which is pushed onto an outside shaft 306 of the sensing structure 104, is rigidly connected mechanically thereto. The connection possibilities are the same as with the connection of the sealing member 112 to the heating rod 400.

Figure 7:
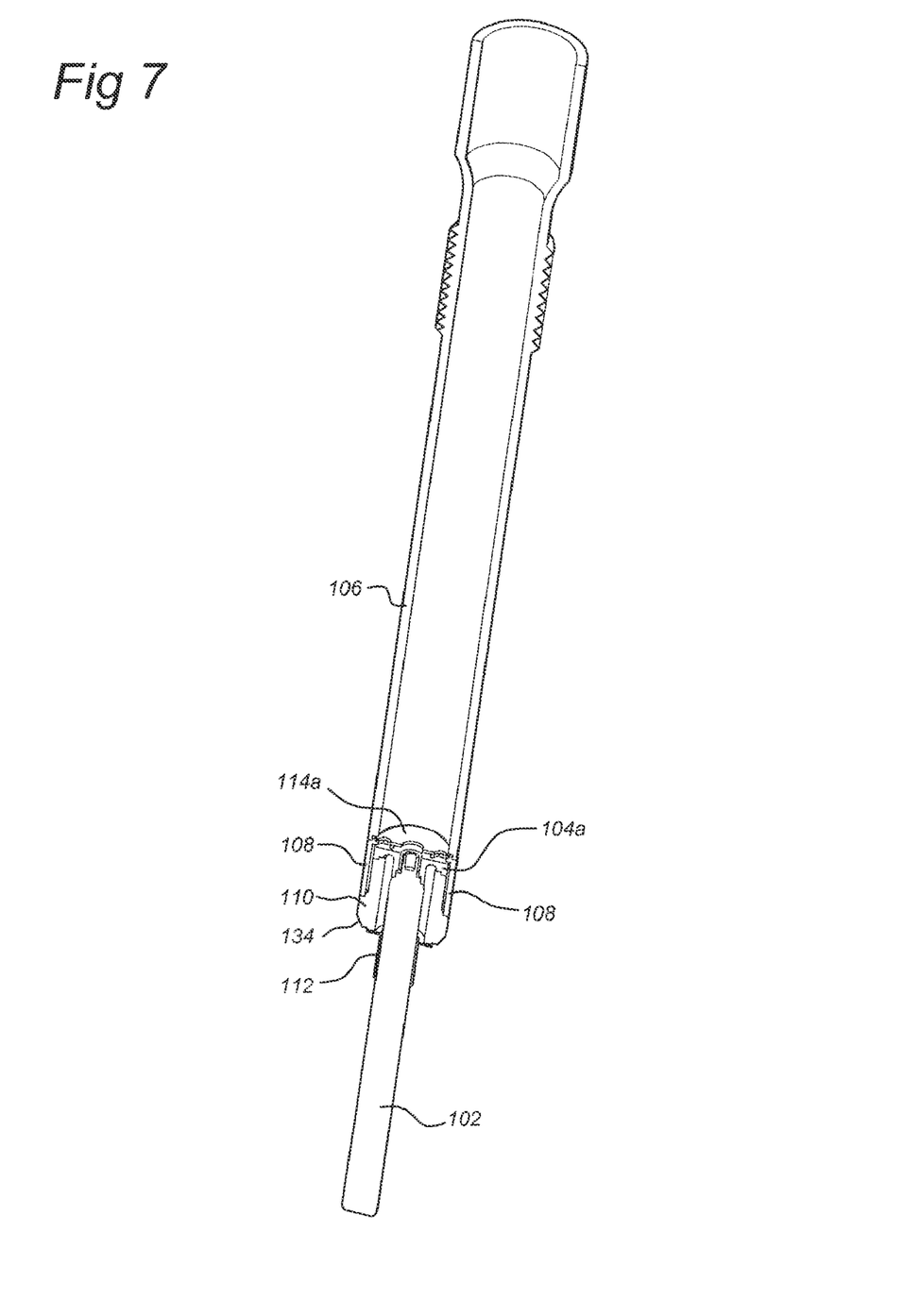
FIG. 7 shows a perspective view of a third embodiment of a sensor arrangement.
Figure 8:
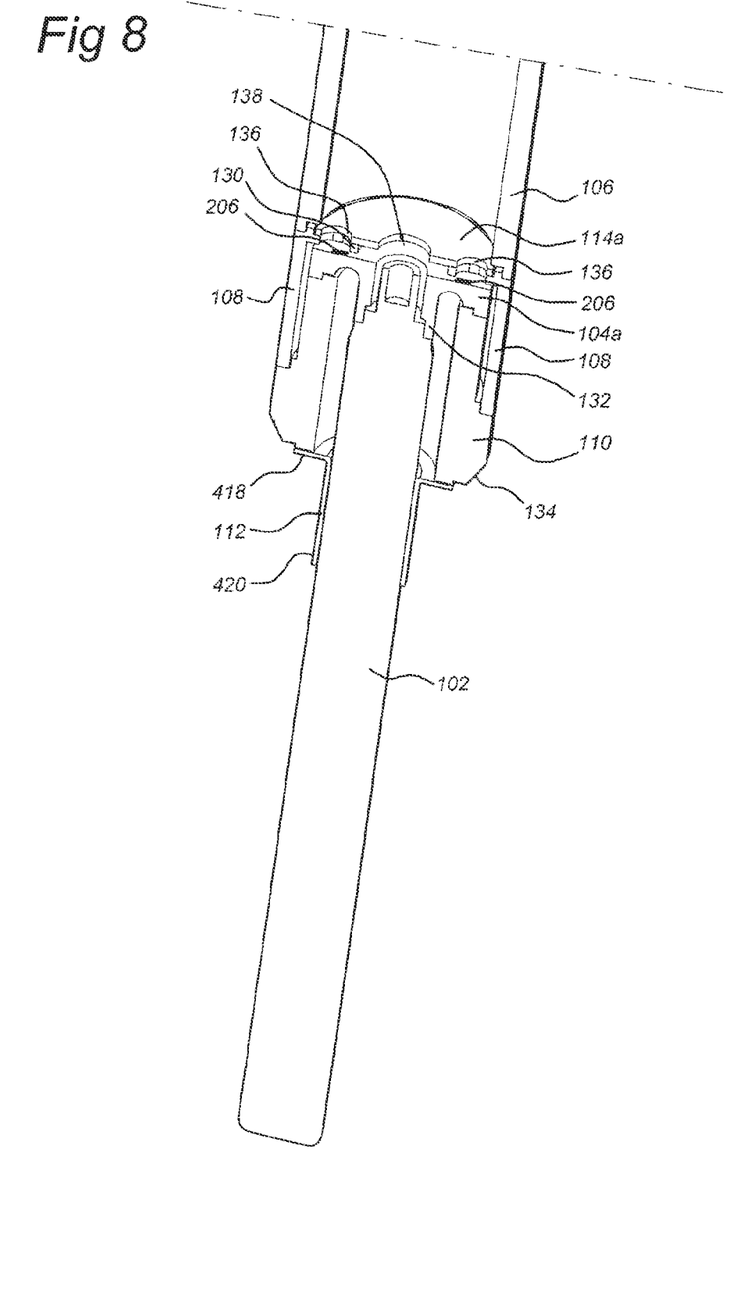
FIG. 8 shows an enlarged perspective view of the third embodiment.

FIG. 7 shows a perspective view of a third embodiment of the invention and FIG. 8 shows an enlarged perspective view of the sensing structure 104a, PWB 114a and rod 102. The body upper part 106 is an elongated body which comprises along a part of its external surface a thread for mounting the sensor arrangement in a combustion engine. A sensing structure 104a is provided in the body middle part 108.

In this embodiment, the sensing structure 104a is a membrane structure, which transforms an axial movement of the rod 102 in a surface strain in radial direction. The piezoresistive elements 206 mounted on the sensing structure 104a provides a resistance change representing the surface strain in radial direction when the rod 102 is moved in axial direction. EP1790964A1 discloses the working principle of such a membrane structure. In this embodiment the sensing structure 104a is mechanically connected to the body lower part 110. The sensing structure 104a comprises a rim 132 on which a cylindrical end part of the rod 102 can be pushed and welded to form a rigid connection. The sensing structure 104a comprises a hole 138 to pass through an electrical connection by means of wires between the heating element of a heating rod or temperature sensor in the rod and sensor electronics which could be positioned on annular PWB 114a.

A sealing element 112 is provided to mechanically connect the rod 102 with the body lower part 110. The sealing element 112 guarantees that the rod 102 can move friction-free in the axial direction in the body lower part 110 and protects the sensing elements 206 and PWB 114a from the extreme temperatures resulting from the combustion process. The sealing element 112 conducts the heat directly to the body lower part 110 which in turn conducts the heat to the engine via a sealing surface 134. The sealing element 112, which is preferably made from a metallic material, is connected mechanically to the external body of rod 102, for example, by means of the fact that a radial circumferential fillet weld is provided at an end face from the cylindrical part 420 of the sealing element 112 to external body of rod 102 or a radial circumferential through-weld is provided in a cylindrical part 420 of the sealing element 112. The connection can be achieved in this region to the heating rod also by means of laser welding, crimping, swaging, soldering, press-fit etc. The sealing element 112 can be in the form of a membrane as shown in FIG. 4 or a bellows-like seal (not shown). Similarly, the other side 418 of the sealing element 112 is rigidly connected to the body lower part 110.

In the third embodiment, the body middle part 108 is provided with an annular flange 130 forming a PWB support part. The annular flange 130 ensures that an annular PWB 114a can be positioned at short distance from the sensing elements 206 mounted on the sensing structure 104a, to enable us to bond the sensing elements 206 by means of bonding wires to the PWB 114a. Both the flange 130 and the annular PWB 114a comprise aligned holes 136 for passing the bonding wires. Furthermore, the sensing structure 104a, the flange 130 and annular PWB 114a comprise a centre hole 138 for passing the rod 102 or passing wires to connect a heating element or temperature sensing element. In another embodiment, the rod 102 passes through the centre hole 138.

The lower body part 110 comprises a sealing surface part 134 and an elongated hollow body part. The elongated hollow body part forms the mechanical connection between the sealing surface part 134 and the sensing structure 104a and extends friction free in the body middle part 108, i.e. there is a free space between the elongated body part and the body middle part 108. The advantage of this structure will be explained hereinafter with reference to FIG. 9.

Figure 9:
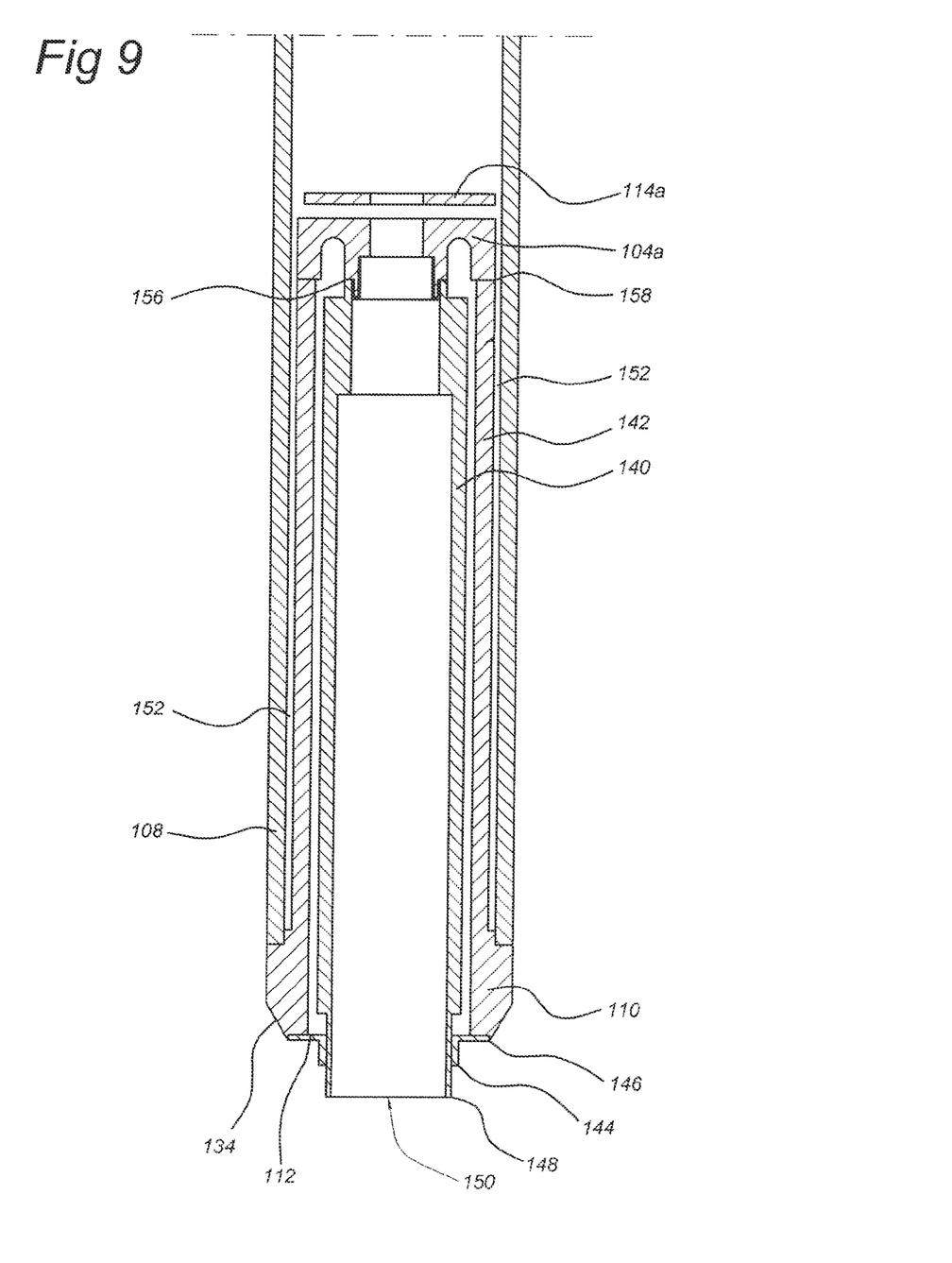
FIG. 9 shows an sectional view of a fourth embodiment of the sensor arrangement.

FIG. 9 shows a fourth embodiment of the invention having many points in common with the third embodiment shown in FIGS. 7 and 8. In this embodiment, the rod 102 is replaced by an elongated interface body 140 comprising a longitudinal through hole 150 for positioning a rod.

FIG. 9 shows that the lower body part 110 comprises a sealing surface part 134 and an elongated hollow body part 142. At one end of the elongated hollow body part 142, it is linked to the sealing surface part 134. At the other end, the sensing structure 104a is attached to the elongated hollow body part 142, for example by means of a weld 158. The elongated hollow body part 142 extends from the sealing surface part 134 friction free in the body middle part 108. Gap 152 between the body middle part 108 and the elongated body part 142 ensures that there is no friction between those part. As a result, the sensing structure 104a is less sensitive to any deformation of the body middle part 108 or body upper part, due to mounting forces when inserting the plug in an engine. By means of the elongated hollow body part 142, the sensing structure 104a is substantially mechanically decoupled from the deformations in sealing surface part 134, body middle part 108 and body upper part 106. It should be noted that the elongated hollow body part 142 could be a tube like part that is welded at one end to the sealing surface part 134 and at the opposite end welded to the sensing structure 104a.

The embodiment shows in FIG. 9 comprises an elongated interface body 140. The elongated interface body 140 comprises a longitudinal though hole 150 for positioning a rod, for example a heating rod, temperature sensing rod or dummy rod. At one longitudinal end the elongated interface body 148 is welded to the sensing structure 104a, for example by means of a weld 156. At the opposite end the elongated interface body has a free end 148 which extends out of the body lower part 110. Preferably, a sealing element 112 in FIG. 9 in the form of a front membrane 112 is provided to protect the sensing structure 104a against the hot gases from the combustion. Furthermore, the front membrane 112 acts like a temperature barrier preventing hot combustion gasses entering the structure and increases the sensor bandwidth by fixing the combination of elongated interface body 140 and the rod in radial direction at a maximum distance from the sensing structure 104a. The sealing element 112 could also be in the form of a bellow shaped membrane. The sealing element 112 is coupled to the body lower part 110 and elongated interface body 140 by means of circular welds 146 and 144 respectively. The location of sealing element 112 can be at the outer side of sealing surface part 134 or slightly recessed relative to the sealing surface to prevent handling damages.

The body lower part 110, elongated hollow body 142, sensing structure 104a and sealing element 112 form a pressure sensing unit which could be calibrated before the rod is attached to the elongated interface body 140. In this unit the body lower part 110 has a sealing surface 134 which forms a seal when the plug is positioned in an engine and as such supports both the body middle part 108 and the membrane 104a. Furthermore, as the elongated hollow body part 142 and sensing structure 104a are friction free positioned in the plug body, the sensing structure will not suffer from plug body compression due to mounting the plug body in the engine. This prevents for possible offset changes in the piezoresistive elements and eliminates pre-load on the sealing element 112. Therefore, the use of the elongated hollow body 142 providing the rigid mechanical connection between the body lower part 110 and sensing structure 104a allows to perform a calibration of the pressure measuring structure before final assembly into a pressure sensing glow rod, as well as reduces the need to compensate for temperature induced offset shifts after the plug is mounted in an engine.

The elongated interface body 140 enables to calibrate the pressure measuring plug before the plug is finalized, i.e. before a heating rod, temperature measuring rod or dummy rod is welded to the pressure sensing unit. This allows to manufacture a calibrated pressure measuring plug sub assembly and that another manufacturer can finalize the plug by mounting the required rod to the sub assembly, i.e. to obtain a combined pressure measuring/glow plug, combined pressure and temperature measuring plug or pressure measuring plug with dummy rod. As the mounting of the rod to the elongated interface body does not introduce an offset or sensitivity shift in the sensing structure no additional calibration is needed. Furthermore, effective pressure area of the plug is defined by the opening in the body lower part 110, as both the membrane and plug are movable with respect to the opening. Therefore a pressure calibration is feasible before welding the final rod to the sensor, by using a temporary seal member to close the opening 150 of the elongated interface body. The plug provided with detachable seal member can be pressure-calibrated. By detaching the seal member, a calibrated pressure measuring plug sub assembly is obtained which could be finalized by a third party by welding the final rod to the free end of the elongated interface body 140, thus providing the necessary closing of the through hole 150. The attachment of the final rod and mounting the finalized plug in an engine will not influence the characteristics of the pressure measurement part of the plug such that a subsequent calibration is needed before using the pressure signal generated by the plug to control the engine.

According to the invention the combustion pressure acts on the external surface of the rod. The pressure acting on the rod and front membrane is transferred to the elongated interface body and in this way translated into a force acting on the sensing structure 104a. The elongated interface body moved up and down inside the plug body along its longitudinal axis due to pressure changes. The elongated interface body is held in place by both the sense element and the front membrane. The longitudinal displacement of the elongated interface body is substantially proportional to the pressure of the fluid acting on the pressure measuring plug.

In the embodiments given, by means of the sealing member 112, the heating rod 400 is thermally uncoupled from the plug body 110, 108 and the heating rod is supported elastically via the sealing member 112 in the plug body 110, 108. Furthermore, a tension can be exerted on the sensing structure 104 due to connection between the plug body 110 and the external body 102 by means of the sealing member 112. The tension may vary due to temperature changes. The sensor electronics on PWB 114 is arranged to filter out the corresponding variations in the resistance value of the piezoelectric element 206.

The rod 102, plug body 110, 108, 106, and sensing structure 104 of the sensing structure 104 are preferably made of a high-resistance stainless steel, such as a precipitation hardening stainless steel with high strength and hardness, excellent corrosion resistance and easy heat treatment.

The rod is preferably made of a weldable material. The sensing structure could be manufactured by a Metal Injection Moulding MIM process. The strain gauges could be Microfused Silicon Strain Gauge made by a Micro Electro Mechanical System (MEMS) process and could be glass-bonded to the sensing structure 104. The sealing element 112 is preferably made of an oxidation and corrosion resistant material well suited for service in extreme environments. Inconel alloys are examples of such a material.

The embodiment shown in FIG. 9 enables one to manufacture a calibrated piezoresistive pressure plug sub-assembly. The method comprises the actions providing such piezoresistive pressure sensor plug with elongated interface body-positioning a temporary rod which act as a sealing member in the through hole of the elongated interface body to seal the through hole; calibrating sensor electronics by exerting a predetermined sequence of pressures on the rod; and removing the rod from the through hole.

Optionally the method could comprise the following actions before the calibration action: providing a front membrane; positioning the front membrane to contact the lower body part and the pressure force interface part; welding the front membrane to the lower body part; and welding the front membrane to the pressure force interface part while a predetermined force in longitudinal direction is exerted on the rod.

The calibrated piezoresistive pressure plug sub-assembly obtained by the method described above could be processed by the following method of manufacturing a calibrated piezoresistive pressure plug assembly. The method comprises the actions: providing a calibrated piezoresistive pressure plug sub-assembly obtained by the method described above, providing a rod; positioning the rod in the through hole of the elongated interface body; and welding the rod to the elongated interface body. Several embodiments of the invention have been described above by way of exemplary embodiments. Various modifications and variations for the elements described with respect of these embodiments may be made by the skilled person without departing from the scope of the present invention, which is defined by the appended claims.

The invention claimed is:

1. A piezoresistive pressure-measuring plug for a combustion engine comprising:
    a plug body insertable into a cylinder of the combustion engine,
    a rod that is arranged in the plug body, and
    a sensing structure that is arranged between the rod and the plug body, and in such a way that the sensing structure is acted upon, in use, by the pressure prevailing in the combustion chamber of the cylinder, whereby the rod transmits the pressure in the combustion chamber of the cylinder to the sensing structure due to the pressure in the combustion chamber leading to an axial motion of the rod relative to the plug body so as to apply a force to the sensing structure, wherein the sensing structure is integrated and located in the plug body and a piezoresistive element mounted on the sensing structure provides a resistance change when the rod is moved in axial, wherein the plug further comprises a Printed Wiring Board (PWB) carrying sensor electronics for measuring and conditioning the resistance change, wherein the PWB is arranged in the plug body, and wherein the plug body comprises a threaded body part, and wherein the PWB is arranged in the threaded body part.

2. The piezoresistive pressure-measuring plug according to claim 1, wherein the sensing structure comprises a flat section on which the piezoresistive element is mounted.

3. The piezoresistive pressure-measuring plug according to claim 1, wherein in use the sensing structure is compressed in axial direction by the force applied to the sensing structure and a piezoresistive element mounted on the sensing structure provides a resistance change corresponding to the surface strain in axial direction.

4. The piezoresistive pressure-measuring plug according to claim 1, wherein the sensing structure is thinned at the position where the piezoresistive element is bonded on the sensing structure.

5. The piezoresistive pressure-measuring plug according to claim 1, wherein the rod is a heating rod.

6. The piezoresistive pressure-measuring plug according to claim 1, further comprising:
    a printed wiring board (PWB) carrying sensor electronics for measuring and conditioning the resistance change;
    wherein the plug body comprises a threaded body part, and wherein the PWB is arranged in the threaded body part; and
    wherein the sensing structure and the piezoresistive element are positioned in the plug body beyond the threaded body part such that when the piezoresistive pressure-measuring plug is inserted in the combustion engine, the sensing structure and the piezoresistive element are located in the combustion chamber of the cylinder.

7. The piezoresistive pressure-measuring plug according to claim 1, wherein the rod comprises a temperature sensor.

8. The piezoresistive pressure-measuring plug according to claim 7, wherein the sensing structure comprises a channel allowing to pass at least one electric wire, wherein the channel centrally passes through the sensing structure in axial direction.

9. The piezoresistive pressure-measuring plug according to claim 1, wherein the sensing structure is a membrane structure, which transforms an axial movement of the rod in a surface strain in radial direction and the piezoresistive element mounted on the sensing structure provides a resistance change representing the surface strain in radial direction when the rod is moved in axial direction.

10. The piezoresistive pressure-measuring plug according to claim 9, wherein the sensing structure is provided between the body upper part and a body lower part.

11. The piezoresistive pressure-measuring plug according to claim 9, wherein a body middle part is provided with annular flange for positioning an annular PWB in the plug body.

12. Method of manufacturing a calibrated piezoresistive pressure plug sub-assembly, the method comprising:
    providing a piezoresistive pressure sensor plug comprising a plug body and a sensing structure, the plug body configured for insertion into a cylinder of a combustion engine, the sensing structure arranged in the plug body between a pressure force interface part and the plug body, the sensing structure configured such that when acted upon by pressure prevailing in the combustion chamber of the cylinder the pressure force interface part transmits the pressure in the combustion chamber of the cylinder to the sensing structure via axial motion of the pressure force interface part relative to the plug body such that the pressure force interface part applies a force to the sensing structure, wherein a piezoresistive element mounted on the sensing structure provides a resistance change when the pressure force interface part is moved via axial motion, the plug body includes a body lower part and a body middle part, the body lower part is a sealing surface part that provides a seal between the body lower part and the combustion engine when inserted in the combustion engine, the piezoresistive pressure sensor plug further comprises an elongated hollow body part at an end linked to the sealing surface part, the elongated hollow body part extends friction free in the body middle part, the sensing structure is attached to an end of the lower body part opposite to the end linked to the sealing surface part, the pressure force interface part is an elongated interface body comprising a through hole for receiving a rod;
    providing a front membrane;
    positioning a temporary sealing member in the through hole;
    positioning the front membrane to contact the lower body part and the pressure force interface part;
    welding the front membrane to the lower body part;
    welding the front membrane to the pressure force interface part;
    calibrating sensor electronics by exerting a predetermined sequence of pressures on the assembly; and
    removing the temporary sealing member from the through hole.

13. The method of manufacturing a calibrated piezoresistive pressure plug assembly according to claim 12, the method further comprising:
  providing a calibrated piezoresistive pressure plug subassembly;
  providing a rod;
  positioning the rod in the through hole of the elongated interface body; and
  welding the rod to the elongated interface body.

14. The method of manufacturing a calibrated piezoresistive pressure plug assembly according to claim 13, wherein the rod is a heating rod.

15. The method of manufacturing a calibrated piezoresistive pressure plug assembly according to claim 13, wherein the rod comprises a temperature sensor.

16. A piezoresistive pressure-measuring plug for a combustion engine comprising:
  a plug body insertable into a cylinder of the combustion engine;
  a rod that is arranged in the plug body;
  a sensing structure that is arranged between the rod and the plug body, and in such a way that the sensing structure is acted upon, in use, by the pressure prevailing in the combustion chamber of the cylinder, whereby the rod transmits the pressure in the combustion chamber of the cylinder to the sensing structure due to the pressure in the combustion chamber leading to an axial motion of the rod relative to the plug body so as to apply a force to the sensing structure, wherein the sensing structure is integrated and located in the plug body and a piezoresistive element mounted on the sensing structure provides a resistance change when the rod is moved in axial direction;
  a Printed Wiring Board (PWB) carrying sensor electronics for measuring and conditioning the resistance change, wherein the PWB is arranged in the plug body;
  wherein the plug body comprises a threaded body part, and wherein the PWB is arranged in the threaded body part;
  wherein when in use the sensing structure is compressed in axial direction by the force applied to the sensing structure and the piezoresistive element mounted on the sensing structure provides a resistance change corresponding to the surface strain in axial direction; and
  wherein the sensing structure is a membrane structure that transforms axial movement of the rod in a surface strain in radial direction and the piezoresistive element mounted on the sensing structure provides a resistance change representing the surface strain in radial direction when the rod is moved in axial direction.

* * * * *